(12) United States Patent
Brott

(10) Patent No.: US 7,677,733 B2
(45) Date of Patent: Mar. 16, 2010

(54) METHOD OF DESIGNING A MATCHED LIGHT GUIDE FOR A STEREOSCOPIC 3D LIQUID CRYSTAL DISPLAY

(75) Inventor: Robert L. Brott, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 338 days.

(21) Appl. No.: 11/865,857

(22) Filed: Oct. 2, 2007

(65) Prior Publication Data
US 2008/0086289 A1   Apr. 10, 2008

Related U.S. Application Data

(60) Provisional application No. 60/828,399, filed on Oct. 6, 2006.

(51) Int. Cl.
*G09G 3/36* (2006.01)
*G02B 27/22* (2006.01)

(52) U.S. Cl. .......................... 353/7; 359/34; 359/201.1; 385/146; 362/30; 353/33; 353/34

(58) Field of Classification Search .............. 353/7, 353/33, 34; 359/34, 201.1; 385/146; 362/30
See application file for complete search history.

(56) References Cited

U.S. PATENT DOCUMENTS

| | | | | |
|---|---|---|---|---|
| 4,367,486 A | * | 1/1983 | Eichenlaub | 348/42 |
| 4,717,949 A | * | 1/1988 | Eichenlaub | 348/54 |
| 4,945,407 A | * | 7/1990 | Winnek | 348/59 |
| 5,132,839 A | * | 7/1992 | Travis | 359/462 |
| 5,291,330 A | * | 3/1994 | Daniels | 359/478 |
| 5,818,399 A | * | 10/1998 | Omori et al. | 345/8 |
| 5,897,184 A | | 4/1999 | Eichenlaub et al. | |
| 5,929,951 A | | 7/1999 | Sasakura et al. | |
| 6,157,474 A | * | 12/2000 | Orr et al. | 359/23 |
| 6,271,896 B2 | | 8/2001 | Moseley et al. | |
| 6,473,141 B2 | | 10/2002 | Moseley et al. | |
| 6,618,530 B1 | | 9/2003 | Lundin | |
| 6,831,624 B1 | | 12/2004 | Harrold | |

(Continued)

FOREIGN PATENT DOCUMENTS

JP   2005-266293   9/2005

(Continued)

OTHER PUBLICATIONS

"3-D Displays: A review of current technologies", Pastoor and Wopking, Oct. 2002. Printed from http://www.dgp.toronto.edu/~gf/Research/.*

(Continued)

*Primary Examiner*—Michael D Masinick

(57) ABSTRACT

A method of designing a backlight light guide for an autostereoscopic 3D display includes specifying a backlight having a light guide thickness and extractor angle and a light transmission surface having a predetermined width value and a predetermined length value. Then, the method includes selecting a plurality of design parameter value pairs, where each parameter value pairs includes a light guide thickness value and a prism angle value, and each design parameter value pair is different from each other. Then the method includes executing an ray tracing optical model on the light guide for each parameter value pair to calculate output data for each parameter value pair, the output data including a single pass light extraction efficiency value, an average minimum light angle value emitted from the second surface, and a maximum flux/minimum flux value emitted from the second surface; and selecting a parameter value pair based on the output data to manufacture the light guide for an autostereoscopic 3D display.

11 Claims, 7 Drawing Sheets

U.S. PATENT DOCUMENTS

| | | | |
|---|---|---|---|
| 6,831,678 B1 * | 12/2004 | Travis | 348/46 |
| 6,970,290 B1 | 11/2005 | Mashitani et al. | |
| 7,057,638 B1 | 6/2006 | Yuuki et al. | |
| 7,058,252 B2 * | 6/2006 | Woodgate et al. | 385/16 |
| 7,210,836 B2 * | 5/2007 | Sasagawa et al. | 362/606 |
| 7,327,929 B2 * | 2/2008 | Chien et al. | 385/146 |
| 7,404,645 B2 * | 7/2008 | Margulis | 353/31 |
| 7,419,265 B2 * | 9/2008 | Relke et al. | 353/7 |
| 7,528,893 B2 * | 5/2009 | Schultz et al. | 349/12 |
| 7,530,721 B2 | 5/2009 | Mi et al. | |
| 2001/0001566 A1 | 5/2001 | Moseley et al. | |
| 2002/0001128 A1 * | 1/2002 | Moseley et al. | 359/465 |
| 2002/0005921 A1 | 1/2002 | Sasakura et al. | |
| 2002/0126389 A1 | 9/2002 | Moseley et al. | |
| 2004/0046910 A1 | 3/2004 | Sasakura et al. | |
| 2004/0130884 A1 | 7/2004 | Yoo et al. | |
| 2004/0240777 A1 * | 12/2004 | Woodgate et al. | 385/16 |
| 2005/0052750 A1 | 3/2005 | King et al. | |
| 2005/0073625 A1 | 4/2005 | Daiku et al. | |
| 2005/0276071 A1 | 12/2005 | Sasagawa et al. | |
| 2005/0280894 A1 | 12/2005 | Hartkop et al. | |
| 2006/0050047 A1 | 3/2006 | Jin et al. | |
| 2006/0132673 A1 | 6/2006 | Ito et al. | |
| 2006/0139711 A1 * | 6/2006 | Leister et al. | 359/9 |
| 2007/0109811 A1 * | 5/2007 | Krijn et al. | 362/619 |
| 2007/0126691 A1 | 6/2007 | Lin et al. | |
| 2007/0258140 A1 * | 11/2007 | Shestak et al. | 359/465 |
| 2009/0244270 A1 * | 10/2009 | Takagi et al. | 348/58 |

FOREIGN PATENT DOCUMENTS

| WO | WO 2004/008226 | 1/2004 |
|---|---|---|
| WO | WO 2004/027492 | 4/2004 |
| WO | WO 2005/088599 | 9/2005 |

OTHER PUBLICATIONS

Ishikawa et al. "New Design for a Highly Collimating Turning Film," Eastman Kodak Company, SID 06 Digest, p. 514-517, 2006.

* cited by examiner

METHOD OF DESIGNING A MATCHED LIGHT GUIDE FOR A STEREOSCOPIC 3D LIQUID CRYSTAL DISPLAY

CROSS-REFERENCE TO RELATED APPLICATION

This application claims the benefit of U.S. Provisional Application Ser. No. 60/828,399 filed Oct. 6, 2006.

FIELD

The present disclosure relates to a method of designing a matched light guide for a stereoscopic 3D liquid crystal display.

BACKGROUND

A stereoscopic 3D display usually presents an observer with images with parallax from individual right and left eye viewpoints. There are two methods of providing the two eyes of the observer with the parallax images in a time sequential manner. In one method, the observer utilizes a pair of shutter or 3D glasses which transmit or block light from the viewer's eyes in synchronization with alternating the left/right image display. Similarly, in another method, right eye and left eye viewpoints are alternatively displayed and presented to the respective eyes of the observer but without the use of 3D glasses. This second method is referred to as autostereoscopic and is sometimes desirable for stereo 3D viewing because separate glasses are not needed though there is limited permissible head motion.

A liquid crystal display (LCD) is a sample and hold display device such that the image at any point or pixel of the display is stable until that pixel is updated at the next image refresh time, typically 1/60 of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa.

BRIEF SUMMARY

The present disclosure relates to a method of designing a matched light guide for a stereoscopic 3D liquid crystal display.

In a first embodiment, a method of designing a backlight light guide for an autostereoscopic 3D display includes specifying a backlight having a light guide defined by a first side and a second side opposite the first side, and having a first surface extending between the first and second sides and a second surface opposite the first surface and extending between the first and second sides. A distance between the first surface and the second surface defining a light guide thickness. The first surface substantially re-directs light with a plurality of prism features having a prism angle and the second surface substantially transmits light. The second surface having a predetermined width value and a predetermined length value. A first light source is positioned to transmit light into the first side and a second light source is positioned to transmit light into the second side. Then the method includes selecting a plurality of design parameter value pairs. Each parameter value pairs includes a light guide thickness value and a prism angle value, and each design parameter value pair is different from each other. Executing a ray tracing optical model on the light guide for each parameter value pair to calculate output data for each parameter value pair. The output data includes a single pass light extraction efficiency value, an average minimum light angle value emitted from the second surface, and a maximum flux/minimum flux value emitted from the second surface. Then the method includes, selecting a parameter value pair based on the output data to manufacture the light guide for an autostereoscopic 3D display. The selected parameter value pair provides an average minimum light angle value emitted from the second surface of greater than 60 degrees, a maximum flux to minimum flux ratio emitted from the second surface is in a range from 5:1 to 1:1, and a maximized single pass light extraction efficiency value.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
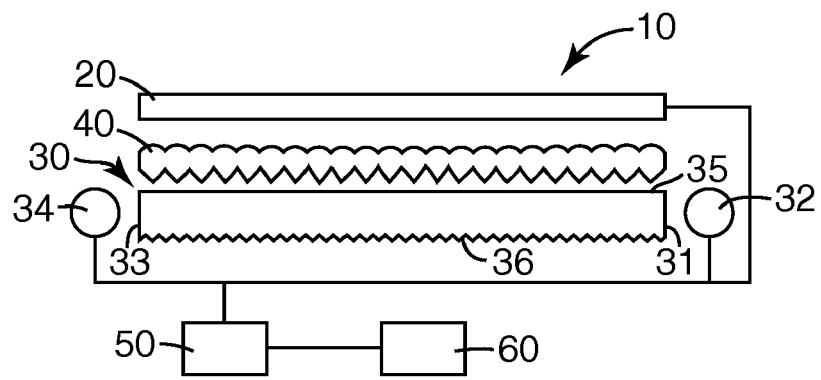
FIG. 1 is a schematic side view of an illustrative display apparatus.

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "autostereoscopic" refers to displaying three-dimensional images that can be viewed without the use of special headgear or glasses on the part of the user or viewer. These methods produce depth perception for the viewer even though the image is produced by a flat device. The term stereoscopic 3D incorporates the field of autostereoscopic devices but also includes the stereoscopic 3D display case in which special headgear, typically shutter glasses, are need to see stereoscopic 3D from a flat device.

The present disclosure relates to a method of designing a matched light guide for a stereoscopic 3D liquid crystal display.

One or more of these embodiments may be combined to design a backlight for a display capable of providing a 3D visualization capability from a flat display either in a shutter glasses stereoscopic 3D display mode or in an autostereoscopic display mode. While the present invention is not so limited, an appreciation of various aspects of the invention will be gained through a discussion of the examples provided below.

A liquid crystal display is a sample and hold display device such that the image at any particular point is stable until that point or pixel is updated at the next image refresh time, typically within 1/60 of a second or faster. In such a sample and hold system, displaying different images, specifically alternating left and right images for a 3D display, during sequential refresh periods of the display requires careful sequencing of the backlight light sources so that, for example, the left eye light source is not on during the display of data for the right eye and vice versa.

FIG. 1 is a schematic side view of an illustrative display apparatus 10. The display apparatus includes a liquid crystal display panel 20 and a backlight 30 positioned to provide light to the liquid crystal display panel 20. The backlight 30 includes a right eye image solid state light source 32 or plurality of first light sources 32, and a left eye image solid state light source 34 or plurality of second light sources 34, capable of being modulated between the right eye image solid state light source 32 and the left eye image solid state light source 34 at a rate of, in many embodiments, at least 90 Hertz. A double sided prism film 40 is disposed between the liquid crystal display panel 20 and the backlight 30.

The liquid crystal display panel 20 and/or backlight 30 can have any useful shape or configuration. In many embodiments, the liquid crystal display panel 20 and backlight 30 has a square or rectangular shape. However, in some embodiments, the liquid crystal display panel 20 and/or backlight 30 has more than four sides or is a curved shape. While the present disclosure is directed to any stereoscopic 3D backlight including those requiring shutter glasses or more than a single lightguide and associated liquid crystal display panel, the present disclosure is particularly useful for autostereoscopic displays.

A synchronization driving element 50 is electrically connected to the backlight 30 plurality of first and second light sources 32, 34 and the liquid crystal display panel 20. The synchronization driving element 50 synchronizes activation and deactivation (i.e., modulation) of the right eye image solid state light source 32 and the left eye image solid state light source 34 as image frames are provided at a rate of, in many embodiments, 90 frames per second or greater to the liquid crystal display panel 20 to produce a flicker-free still image sequence, video stream or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any useful transmissive liquid crystal display panel. In many embodiments, liquid crystal display panel 20 has a frame response time of less than 16 milliseconds, or less than 10 milliseconds, or less than 5 milliseconds. Commercially available transmissive liquid crystal display panels having a frame response time of less than 10 milliseconds, or less than 5 milliseconds, or less than 3 milliseconds, are for example Toshiba Matsushita Display's (TMD) optically compensated bend (OCB) mode panel LTA090A220F (Toshiba Matsushita Display Technology Co., Ltd., Japan).

The backlight 30 can be any useful backlight that can be modulated between a right eye image solid state light source 32 and left eye image solid state light source 34 at a rate of, in many embodiments, at least 90 Hertz, or 100 Hertz, or 110 Hertz, or 120 Hertz, or greater than 120 Hertz.

The illustrated backlight 30 includes a first side 31 or first light input surface 31 adjacent to the plurality of first light sources 32 or right eye image solid state light source 32 and an opposing second side 33 or second light input surface 33 adjacent to the plurality of second light sources 34 or left eye image solid state light source 34. A first surface 36 extends between the first side 31 and second side 33 and a second surface 35, opposite the first surface 36, extends between the first side 31 and second side 33. The first surface 36 substantially re-directs (e.g., reflects, extracts, and the like) light and the second surface 35 substantially transmits light. In many embodiments, a highly reflective surface is on or adjacent to the first surface 36 to assist in re-directing light out through the second surface 35.

The first surface 36 includes a regular array of linear prism extraction elements as shown. The regular array of linear prisms extend in a direction parallel to the first side 31 and second side 33 or parallel to the linear prism and lenticular features of the double sided prism film 40.

The solid state light sources can be any useful solid state light source that can be modulated at a rate of, for example, at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as red, blue, and/or green, or range or combinations of wavelengths to produce, for example, white light. The backlight can be a single layer of optically clear material with light sources at both ends or two (or more) layers of optically clear material with a light source per layer which preferentially extract light in a desired direction for each layer.

The double sided prism film 40 can be any useful prism film having a lenticular structure on a first side and a prismatic structure on an opposing side. The double sided prism film 40 transmits light from the backlight to the liquid crystal display panel 20 at the proper angles such that a viewer perceives depth in the displayed image. Useful, double sided prism films are described in United States Patent Publication Nos. 2005/0052750 and 2005/0276071, which are incorporated herein to the extent they do not conflict with the present disclosure.

The image source 60 can be any useful image source capable of providing images frames (e.g., right eye images and left eye images) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of, for example, 90 frames per second or greater to the liquid crystal display panel 20 to produce a flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
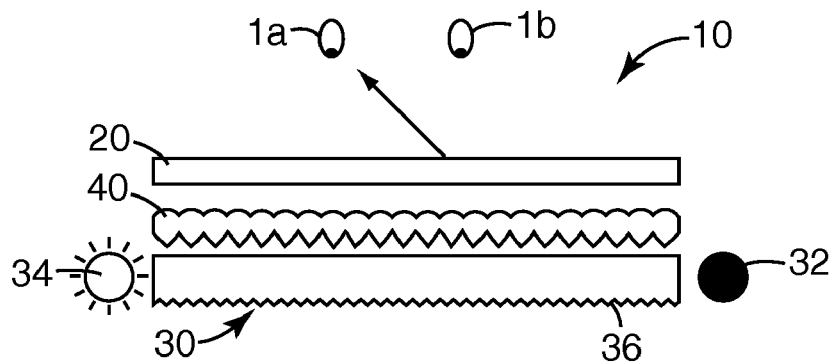
FIG. 2A and FIG. 2B are schematic side views of an illustrative display apparatus in operation.
Figure 2B:
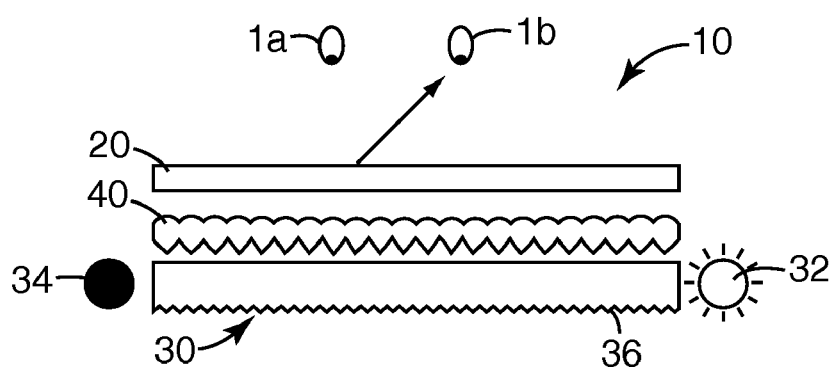

FIG. 2A and FIG. 2B are schematic side views of an illustrative display apparatus 10 in operation. In FIG. 2A the left eye image solid state light source 34 (i.e., plurality of second light sources 34) is illuminated and the right eye image solid state light source 32 (i.e., plurality of first light sources 32) is not illuminated. In this state, the light emitted from the left eye image solid state light source 34 transmits through the backlight 30, through the double sided prism sheet 40, and liquid crystal panel 20 providing a left eye image directed toward the left eye 1*a* of an viewer or observer. In FIG. 2B the right eye image solid state light source 32 is illuminated and the left eye image solid state light source 34 is not illuminated. In this state, the light emitted from the right eye solid state light source 32 transmits through the backlight 30, through the double sided prism sheet 40, and liquid crystal panel 20 providing a right eye image directed toward the right eye 1*b* of an viewer or observer. It is understood that while the right eye solid state light source 32 is located on the right side of the light guide and the left eye image solid state light source 34 is located on the left side of the light guide, is some embodiments, the right eye solid state light source 32 is located on the left side of the light guide and the left eye image solid state light source 34 is located on the right side of the light guide.

The light sources 32, 34 can be air coupled or index matched to the backlight light guide. For example, a packaged light source device (e.g., LED) can be edge-coupled without index matching material into the light guide. Alternatively, packaged or bare die LEDs can be index matched and/or encapsulated in the edge of the light guide for increased efficiency. This feature may include additional optical features, e.g., injection wedge shapes, on the ends of the light guide to efficiently transport the input light. The LEDs can be alternatively embedded in the edge or side 31, 33 of the light guide with appropriate features to efficiently collect and collimate the LED light into TIR (i.e., total internal reflection) modes of the light guide.

Liquid crystal display panels 20 have a refresh or image update rate that is variable, but for the purposes of this example, a 60 Hz refresh rate is presumed. This means that a new image is presented to the viewer every 1/60 second or 16.67 milliseconds (msec). In the 3D system this means that at time t=0 (zero) the right image of frame one is presented. At time t=16.67 msec the left image of frame one is presented. At time t=2*16.67 msec the right image of frame two is presented. At time t=3*16.67 msec the left image of frame two is presented, and this process is thus repeated. The effective frame rate is half that of a normal imaging system because for each image a left eye and right eye view of that image is presented.

In this example, turning the first plurality of light sources on to light the right (or left) image at time t=0 provides light to the right (or left) image, respectively. At time t=16.67 msec the second image left or right, starts to be put in place. This image replaces the "time t=0 image" from the top of the LCD panel to the bottom of the LCD, which takes 16.67 msec to complete in this example. Non-scanned solutions turn off all the first plurality of light sources and then turns on all the second plurality of light sources sometime during this transition.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint image pairs from computer rendered images or images acquired from still image cameras or video image cameras, when displayed in synchronization with the switching of the light sources 32 and 34, enables the viewer to visually fuse the two different images, creating the perception of depth from the flat panel display. A limitation of this visually flicker-free operation is that, as discussed above, the backlight should not be on until the new image that is being displayed on the liquid crystal display panel has stabilized; otherwise cross-talk and a poor stereoscopic image will be perceived.

Figure 3:
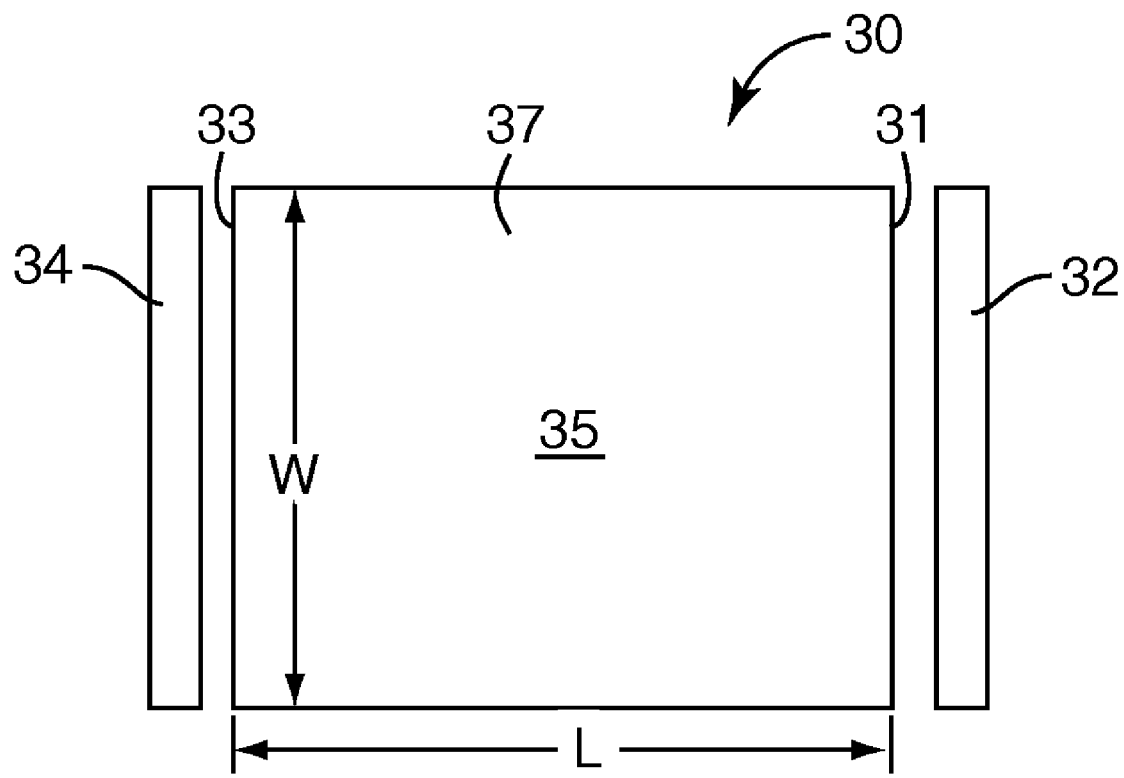
FIG. 3 is a schematic diagram front view of an illustrative backlight for displaying alternating right and left images.

FIG. 3 is a schematic diagram front view of an illustrative backlight 30 for displaying alternating right and left images. The backlight 30 includes a light guide 37 defined by a first side 31 or first light input surface 31 adjacent to the first light sources 32 or right eye image solid state light source 32 and an opposing second side 33 or second light input surface 33 adjacent to the second plurality of light sources 34 or left eye image solid state light source 34. A first surface (36 shown in FIG. 1 and FIG. 4) extends between the first side 31 and second side 33 and a second surface 35, opposite the first surface 36, extends between the first side 31 and second side 33. The first surface 36 substantially re-directs (e.g., reflects, extracts, and the like) light and the second surface 34 substantially transmits light to the double sided prism film and LCD panel, as described in FIG. 1.

The second surface 35 or light transmission surface 35 of the light guide 37 has a length value L and a width value W. The length value L and a width value W and can be predetermined or pre-set values that are fixed during the designing step of the method described herein.

Figure 4:
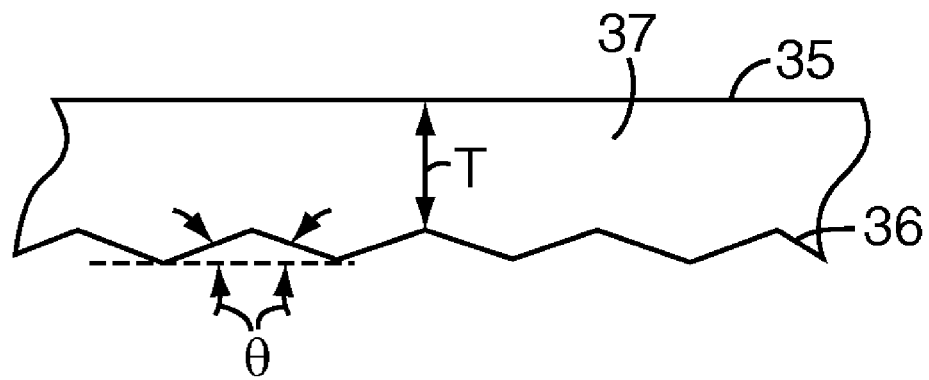
FIG. 4 is a side elevation view of the illustrative backlight.

FIG. 4 is a side elevation view of the illustrative backlight light guide 37 portion. The light guide portion 37 has a thickness value T (a distance between the first surface 36 and the second surface 35) that can be altered or a plurality or range of thickness values T can be selected during the designing step of the method described herein.

The light guide portion 37 has a regular array of linear prism features at the first surface 36. Each linear prism feature has a prism angle θ that can be altered or a plurality or range of prism angle θ can be selected during the designing step of the method described herein.

Figure 5:
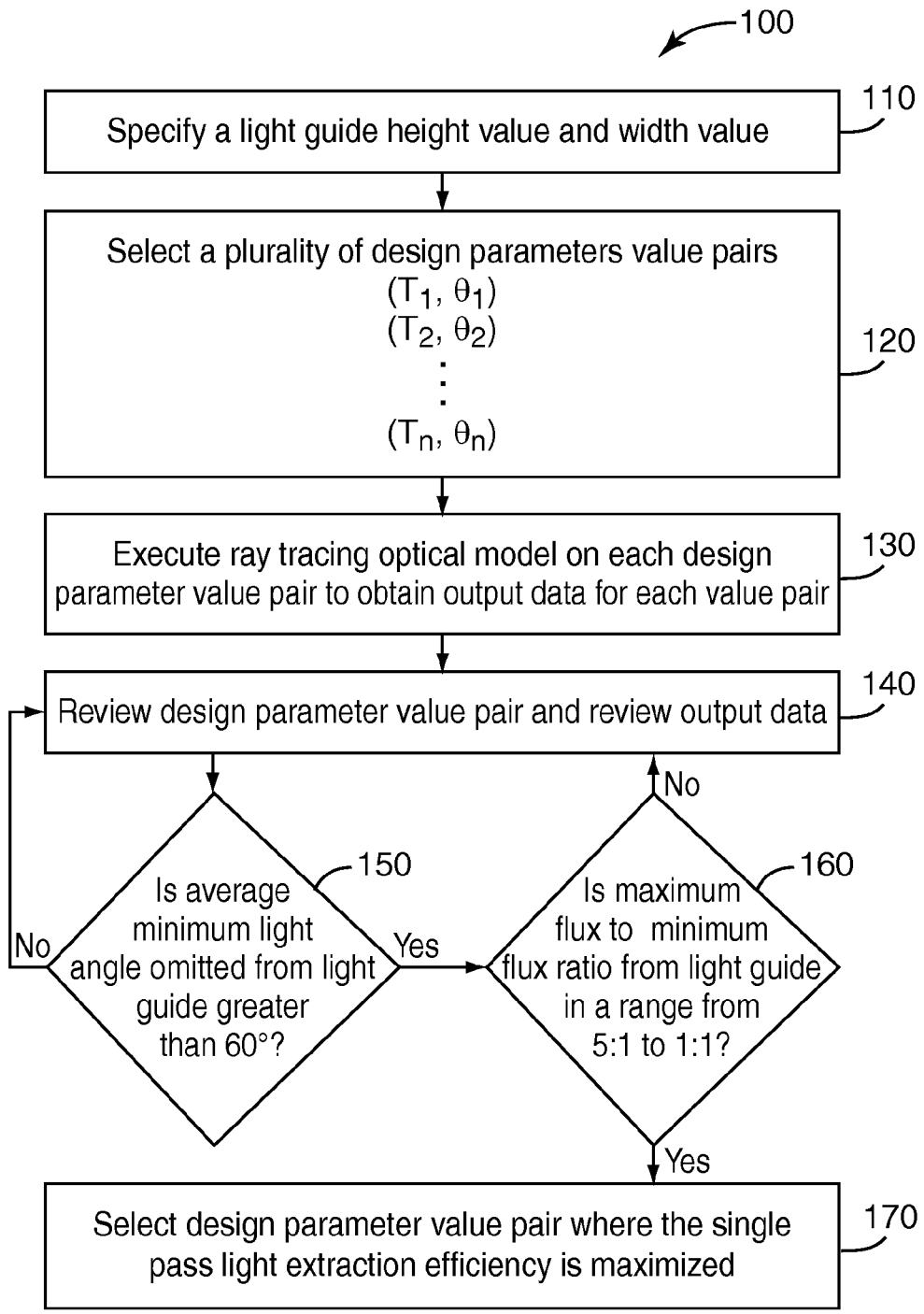
FIG. 5 is a flow diagram of a method of designing a matched light guide for a stereoscopic 3D liquid crystal display.

FIG. 5 is a flow diagram of a method (100) of designing a matched light guide for a stereoscopic 3D liquid crystal display. The method includes specifying (block 110) a backlight having a light guide defined by a first side and a second side opposite the first side, and having a first surface extending between the first and second sides and a second surface opposite the first surface and extending between the first and second sides. A distance between the first surface and the second surface defining a light guide thickness T. The first surface substantially re-directs light with a plurality of prism features having a prism angle θ and the second surface substantially transmits light. The second surface having a predetermined width value W and a predetermined length value L. A first light source is positioned to transmit light into the first side and a second light source is positioned to transmit light into the second side.

Then the method includes selecting (block 120) a plurality of design parameter value pairs. Each parameter value pairs includes a light guide thickness value T and a prism angle value θ, and each design parameter value pair is different from each other. For example, three light guide thickness values $T_1, T_2, T_3$ can be selected and three prism angle values $\theta_1, \theta_2, \theta_3$ can be selected and resulting in a total of nine different design parameter value pairs.

Then the method includes executing (block 130) a ray tracing optical model on the light guide for each parameter value pair to calculate output data for each parameter value pair. The ray tracing optical model can be any useful model such as, for example a ray tracing optical model available under the trade designation TRACEPRO from Lambda Research Corporation (Littleton, Mass.). The output data includes a single pass light extraction efficiency value, an average minimum light angle value emitted from the second surface, and a maximum flux/minimum flux value emitted from the second surface.

Then the method includes selecting (block 170) a parameter value pair based on the output data to manufacture the light guide for an autostereoscopic 3D display. The selected parameter value pair provides an average minimum light angle value emitted from the second surface of greater than 60 degrees (block 150) or greater than 62 degrees, or greater than 65 degrees, a maximum flux to minimum flux ratio emitted from the second surface is in a range from 5:1 to 1:1 (block 160) or in a range from 3:1 to 1:1, or in a range from 2:1 to 1:1, and a maximized single pass light extraction efficiency value.

In further embodiments, the selected parameter value pair provides an overall light extraction efficiency value that is greater than 25%, or greater then 33%, or greater than 40%. In some embodiments, the selected parameter value pair provides a maximized single pass light extraction efficiency value greater than 50%, or greater than 65%.

The following are useful points for the design: the angular distribution is centered about a fixed direction before the light enters the double sided prism film; the distribution of light from the LED light sources is converted into a relatively narrow angular distribution; the extraction of the light along the length of the guide is efficient; and a minimum of light traverses the entire length of the guide. United States Patent Application No. 2005/0276071 describes the design of a double sided prism film, but docs not address how to create the light distribution that would use such a film.

It is desirable for the light reaching the viewer to be well-separated. That is, the image reaching the left eye should not reach the right eye and vice versa. In order to achieve this, the angular distribution of light leaving the light guide needs to be centered about a fixed angle, near 70 degrees for the example double sided prism film. Light aimed at a lower angle tends to be transmitted in undesired directions. That is, if the main peak is towards the left eye, then a large amount of light will be sent towards the right eye.

It is also desirable that the distribution of light reaching the viewer be within a small angle about the desired direction in order to achieve good stereo separation. In many embodiments, this may be about four degrees. By changing the width of the angular distribution leaving the light guide, the width of the distribution at the view is affected.

It is advantageous to extract as much light as possible from the light guide, that is, an optically efficient guide is desirable. However, aggressive extraction can lead to large non-uniformities in brightness along the length or width of the light guide.

Finally, it is advantageous to minimize the amount of light that fully traverses the length of the light guide. Light that reaches the end of the light guide may be reflected back in the opposite direction down the light guide. This reflected light will then be sent to the wrong eye at the viewer, leading to image "cross talk".

This disclosure shows how to design for these desired characteristics of a light guide. In the double sided prism film, the linear prisms function as turning elements, and the parallel linear lenticular array then focuses the distribution to a canonical viewer at about 400 mm viewing distance. This particular double sided prism film has a differential pitch between the linear lenticular array and the linear prism array. This particular lenticular array has a pitch of 70.500 micrometers and the prisms have a pitch of 70.512 micrometers. The purpose of this differential pitch is to provide a slowly varying viewing angle as a function of the width across the film. A viewer centered on the display would be looking straight at the center of the display, but for a 17-inch diagonal display, for example, the viewer is looking at an angle of about 22 degrees at the edge of the display. The lenticular array would then be slightly misaligned with the prisms as the distance increases from the center of the display.

The angular distribution of the light at the viewer is determined by that entering the double prism film. As shown FIG. 6, the overall direction is important. The design here is for the prisms and the lenticular array to be in alignment. This corresponds to a viewer looking directly at the center of the display. For this case it is desirable for light to exit at an angle about four degrees from the normal which corresponds to light striking, say, the left eye (positive viewing angles). Light traversing the opposite direction in the light guide (from a second set of sources) would then be directed at four degrees from normal but in the opposite direction, thus being seen by the right eye (negative viewing angles). For light centered about 70 degrees, almost all of the light is directed towards the left eye. For light centered about 60 degrees, a non-negligible fraction of the light is directed incorrectly; it is sent towards the right eye. This incorrectly directed light is can create cross talk. But this "cross talk" is greatly amplified for the case of the offset design. Consider the graph shown in FIG. 7, where it is desired to have the light centered about ten degrees or so (the viewer is looking not at the center of the display, but towards one edge of the display). In this case, it is desired that light end up at about 14 degrees to reach the left eye. All designs have a great deal of light in the correct direction, but the 60 degree incidence case places a large amount of light in the incorrect direction. Indeed, the spread between the desired peak (14 degrees) and the spurious peak (−15 degrees) is not nearly as large as for the zero micrometer offset case. As the viewer looks towards the edge of the display, this effect becomes even worse. It is thus important that the angular distribution of the light incident on the double sided prism film be centered nominally at 70 degrees.

Figure 6:
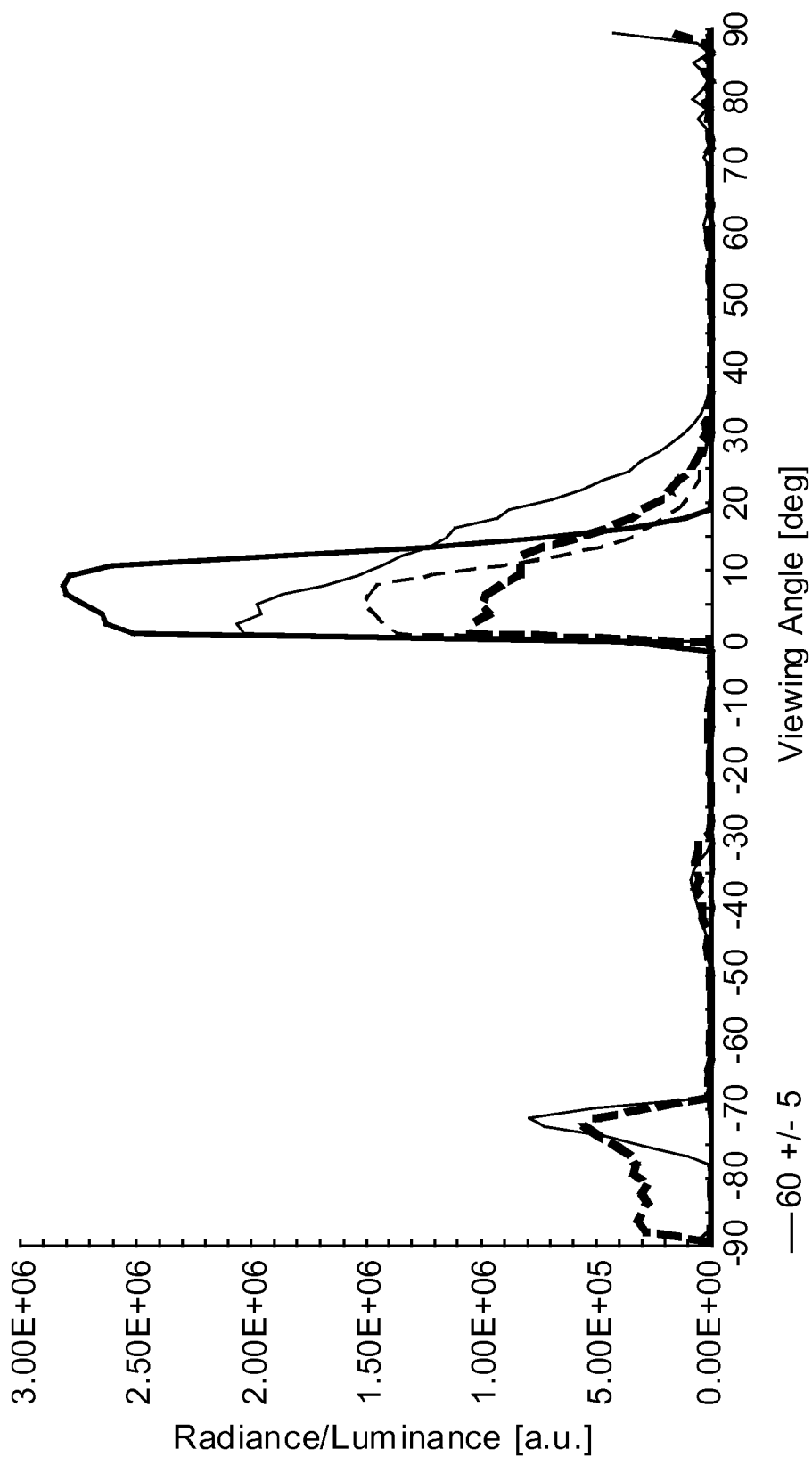
FIG. 6 is a graph illustrating brightness at a viewer for an aligned double sided prism film.
Figure 7:
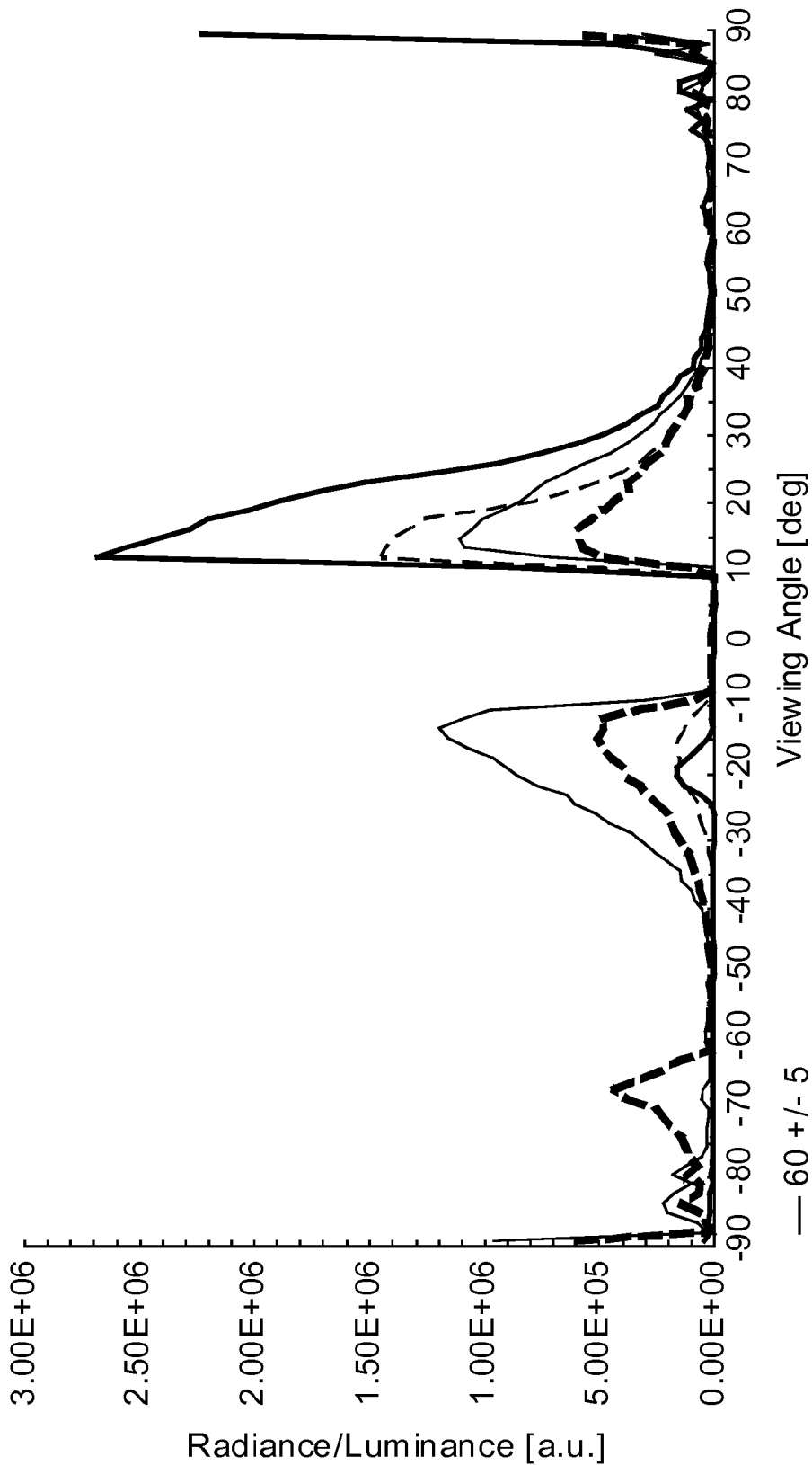
FIG. 7 is a graph illustrating brightness at a viewer for a 20 micrometer offset double sided prism film.

Also shown in FIGS. 6 and 7 is the effect of the width of the angular distribution that is incident on the double sided prism film. For a larger angular spread, the brightness at the viewer is reduced, but, somewhat counter intuitively, the width at the viewer is reduced. Thus, the viewing experience can be modified by controlling the angular distribution width as well as its main direction.

The basic design of the light guide is described above. The light guide is fed from the ends or light input side via an army of white LEDs. The LEDs are air-coupled into a light guide having a width of about one inch and a length of about 14 inches, and from 2 to 6 mm thick. Light bounces down this guide and would indeed be trapped completely by total internal reflection (i.e., TIR) if it were not for the extraction features (e.g., linear extraction prism array) on the light re-directing surface of the light guide. The light re-directing surface of the light guide has shallow prisms that can be formed into it or these prisms are provided on as a separate layer or film that is adhered to the light-redirecting surface. These prisms run vertically, and have a typical angle from horizontal selected from 3 to 9 degrees. The prisms fill the length of the light guide. That is, there are not perfectly flat areas on the back of the guide. A highly reflective surface is adjacent to the light re-directing surface to assist in re-directing light out of the light transmission surface of the light guide.

Within the confines of this design, one can vary the thickness T of the light guide as well as the angle θ of the prismatic extractors. Large angles will lead to light being extracted more rapidly and completely as a function of length down the light guide. As light is traveling down the light guide, it will strike the prisms on the back of the light guide. This will tip the angular distribution of the light. Light that was at the edge of critical (light that is very near the critical angle) will thus be able to escape the guide after it is tipped by its interaction with the prisms.

The first thing to consider in the design of the light guide is the efficiency. There are the following three main metrics. The flux varies as a function of distance across the display. A measurement of this flux variation is the ratio of the maximum flux to the minimum flux (fluxMaxOverMin), which is a measurement of brightness uniformity across the display. Preferably, (fluxMaxOverMin) is small or near unity (e.g., less than 5/1 or 5:1 or 5; less then 3/1 or 3:1 or 3; 2/1 or less than 2:1 or 2; or 1/1, 1:1, 1). Another metric is the fraction of light making it to the end of the guide, endEff or the single pass light extraction efficiency (i.e., 1-endEff). Preferably, endEff is small, as this light has the possibility of coming back down the guide and contributing to cross talk. Yet another metric is the fraction of light making it out of the display towards the viewer the overall efficiency DetEff.

Figure 8:
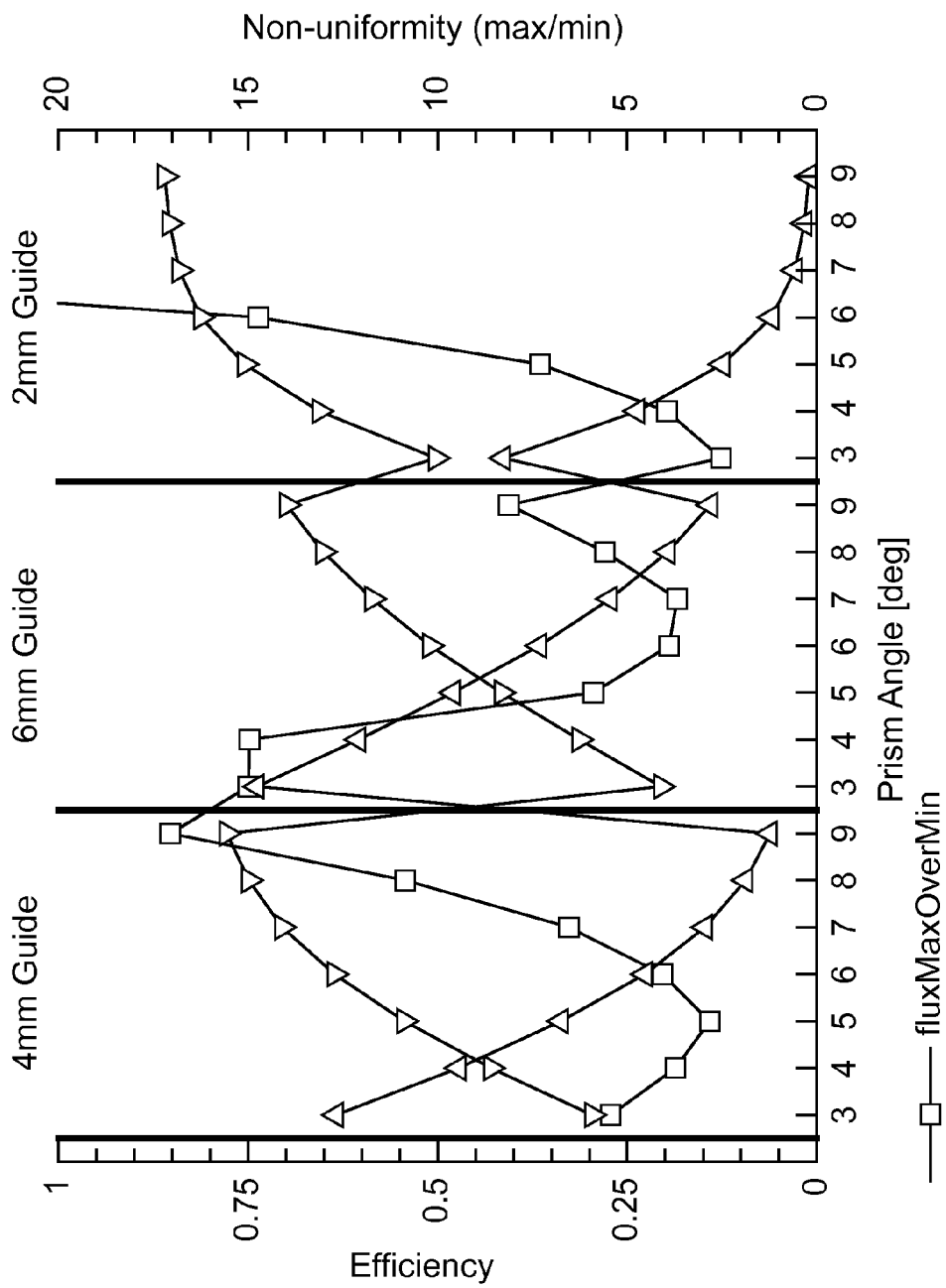
FIG. 8 is a graph illustrating light guide efficiencies.

Preferably, DetEff is large (unity indicating extraction of all the light towards the viewer). Referring to FIG. 8, the efficiencies of the light guide by choosing a plurality of design parameter value pairs are shown. There are three main vertical sections to this graph: a 4 mm thick light guide; a 6 mm thick light guide; and a 2 mm thick light guide. For a given light guide thickness T, the prism extractor angle θ is varied from three to nine degrees. As the prism angle becomes larger the extraction efficiency increases and a smaller amount of light reaches the end of the guide. However, the non-uniformity is worse. A smaller light guide thickness tends to magnify these effects, especially non-uniformity (large fluxMaxOverMin).

Figure 9:
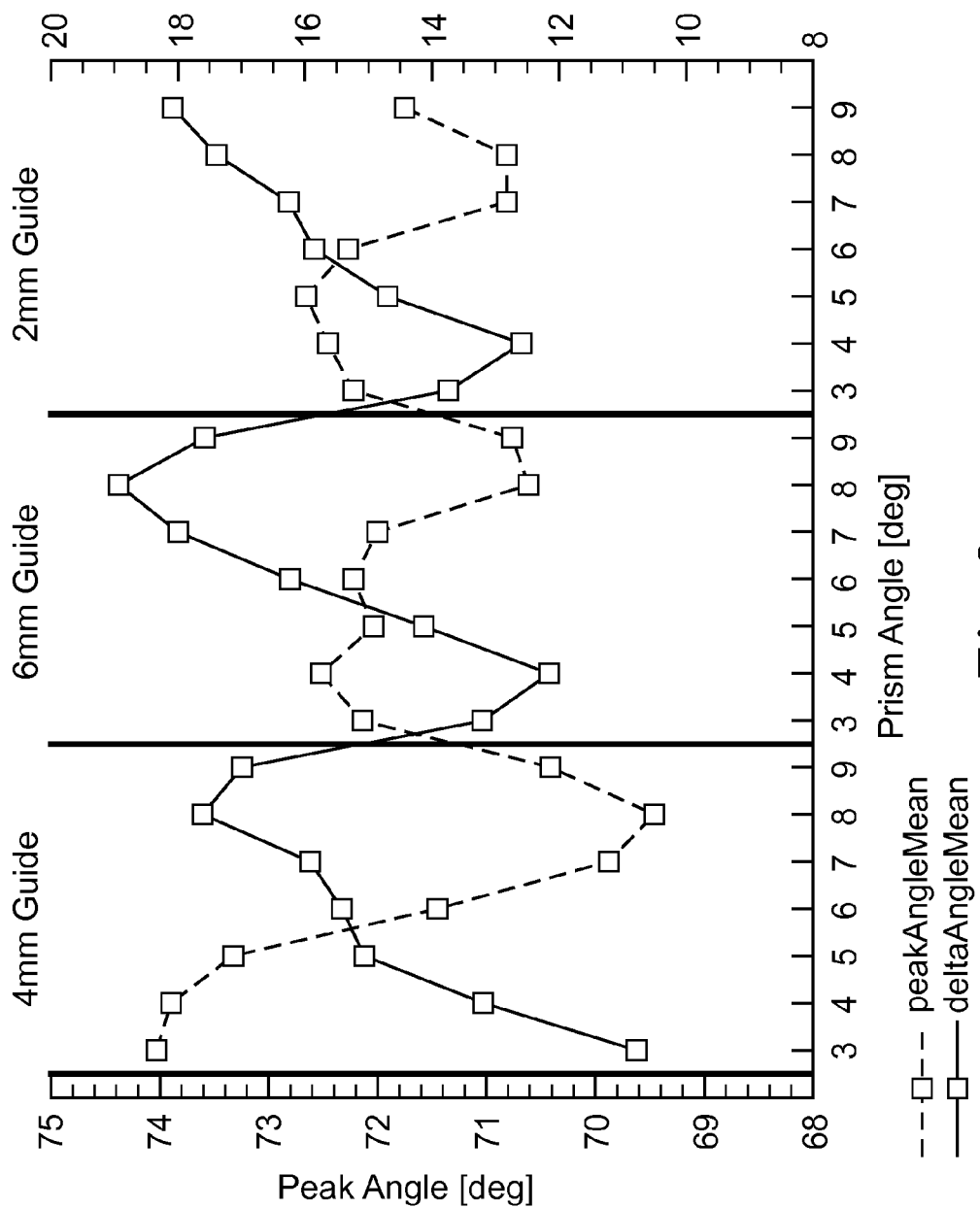
FIG. 9 is a graph illustrating light guide angular distributions.

Efficiency although important, is not the only consideration; the angular distribution of the light must be controlled so that the double sided prism film can function correctly (as described above). The angular distribution should peak around 70 degrees or so, and have a fairly narrow width. Low angles and large widths lead to more light in the "wrong" halfspace. That is, if light was intended to be transmitted to the right, then low angles and large widths will send light to the left as well as the right. Making sure that light distribution does not have much energy at angles less than 60 degrees is desired. By considering FIG. 9 and calculating the small end of the range given as the peak angle minus the delta angle (i.e., average minimum light angle value emitted from the second surface), one can determine when the angular distribution has the majority of its light distributed at angles greater than about 60 degrees, or 62 degrees, or 65 degrees. For the 4 mm guide, this is at about 4.5 degree prisms or less, for the 6 mm guide for 4 degree prisms or less, and for the 2 mm guide, almost never.

Thus, embodiments of the DESIGNING A MATCHED LIGHT GUIDE FOR A STEREOSCOPIC 3D LIQUID CRYSTAL DISPLAY are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of designing a backlight light guide for an autostereoscopic 3D display comprising:

a) specifying a backlight having a light guide defined by a first side and a second side opposite the first side, and having a first surface extending between the first and second sides and a second surface opposite the first surface and extending between the first and second sides, a distance between the first surface and the second surface defining a light guide thickness, wherein the first surface substantially re-directs light with a plurality of prism features having a prism angle and the second surface substantially transmits light, the second surface having a predetermined width value and a predetermined length value, and a first light source positioned to transmit light into the first side and a second light source positioned to transmit light into the second side;

b) selecting a plurality of design parameter value pairs, where each parameter value pairs includes a light guide thickness value and a prism angle value, and each design parameter value pair is different from each other;

c) executing a ray tracing optical model on the light guide for each parameter value pair to calculate output data for each parameter value pair, the output data comprising a single pass light extraction efficiency value, an average minimum light angle value emitted from the second surface, and a maximum flux/minimum flux value emitted from the second surface; and d) selecting a parameter value pair based on the output data to manufacture the light guide for an autostereoscopic 3D display, wherein the selected parameter value pair provides an average minimum light angle value emitted from the second surface of greater than 60 degrees, maximum flux to minimum flux ratio emitted from the second surface is in a range from 5:1 to 1:1, and a maximized single pass light extraction efficiency value.

2. A method according to claim 1, wherein the selected parameter value pair provides a maximum flux to minimum flux ratio emitted from the second surface is in a range from 3:1 to 1:1.

3. A method according to claim 1, wherein the selected parameter value pair provides a maximum flux to minimum flux ratio emitted from the second surface is in a range from 2:1 to 1:1.

4. A method according to claim 1, wherein the selected parameter value pair provides an average minimum light angle value emitted from the second surface of greater than 62 degrees.

5. A method according to claim 1, wherein the selected parameter value pair provides an average minimum light angle value emitted from the second surface of greater than 65 degrees.

6. A method according to claim 1, wherein the selected parameter value pair provides an overall light extraction efficiency value that is greater than 25%.

7. A method according to claim 1, wherein the selected parameter value pair provides an overall light extraction efficiency value that is greater than 33%.

8. A method according to claim 1, wherein the selected parameter value pair provides an overall light extraction efficiency value that is greater than 40%.

9. A method according to claim 1, wherein the selected parameter value pair provides a maximized single pass light extraction efficiency value greater than 50%.

10. A method according to claim 1, wherein the selected parameter value pair provides a maximized single pass light extraction efficiency value greater than 65%.

11. A method according to claim 1, wherein the light source is one or more light emitting diodes.

\* \* \* \* \*